(12) United States Patent
Compton et al.

(10) Patent No.: US 12,043,067 B2
(45) Date of Patent: Jul. 23, 2024

(54) TIRE PRESSURE MONITOR COMMUNICATION SYSTEM, ELECTROMAGNETIC TRANSMISSION SYSTEM HAVING CANCELLATION AND AN ANTENNA ASSEMBLY FOR USE THEREWITH AND METHODS

(71) Applicant: JR Automation Technologies, LLC, Holland, MI (US)

(72) Inventors: Mark Andrew Compton, Lake Orion, MI (US); Kevin Ray Spencer, Sterling Heights, MI (US); Warren Edwin Guthrie, West Olive, MI (US); Eric Joshua Emens, Grand Haven, MI (US); Brandyn Jaymes Blehm, Caledonia, MI (US); Andrew Scott Homrich, Nunica, MI (US); Timothy Cullen Davison, Spring Lake, MI (US)

(73) Assignee: JR Automation Technologies, LLC, Holland, MI (US)

( * ) Notice: Subject to any disclaimer, the term of this patent is extended or adjusted under 35 U.S.C. 154(b) by 167 days.

(21) Appl. No.: 17/880,469

(22) Filed: Aug. 3, 2022

(65) Prior Publication Data

US 2024/0042809 A1 Feb. 8, 2024

(51) Int. Cl.
*B60C 23/04* (2006.01)
(52) U.S. Cl.
CPC ........ *B60C 23/0444* (2013.01); *B60C 23/045* (2013.01)

(58) Field of Classification Search
CPC .......................... B60C 23/0444; B60C 23/045
See application file for complete search history.

(56) References Cited

U.S. PATENT DOCUMENTS

| | | | | |
|---|---|---|---|---|
| 4,373,163 A | * | 2/1983 | Vandebult | H01Q 7/04 340/572.7 |
| 4,996,484 A | * | 2/1991 | Spies | G01V 3/083 324/345 |
| 5,691,731 A | * | 11/1997 | van Erven | B60C 23/0452 343/788 |

(Continued)

FOREIGN PATENT DOCUMENTS

| | | |
|---|---|---|
| CN | 212313197 U | 1/2021 |
| EP | 0943534 A2 | 9/1999 |

*Primary Examiner* — Hoi C Lau
(74) *Attorney, Agent, or Firm* — The Watson IP Group, PLC; Jovan N. Jovanovic

(57) ABSTRACT

A tire pressure monitoring system is configured to communicate with a tire pressure sensor and has an antenna assembly and a transmitter. The antenna assembly has a transmitting and a cancelling antenna. The transmitting antenna has a wire loop defined by a plurality of coils with a first terminal and a second terminal. The cancelling antenna has a wire loop defined by a plurality of coils with a first terminal and a second terminal. The arrangement of the transmitting antenna and the cancelling antenna defines a proximal zone wherein a field from the transmitting antenna is configured to be sufficient to actuate the tire pressure monitor, while beyond the proximal zone, a field from the cancelling antenna cancels the field from the transmitting antenna. The transmitter is coupled to the transmitting antenna, and the cancelling antenna. An antenna and methods are likewise disclosed.

25 Claims, 13 Drawing Sheets

(56) References Cited

U.S. PATENT DOCUMENTS

| | | | | |
|---|---|---|---|---|
| 2010/0302039 A1* | 12/2010 | Goto | ............... | H01Q 7/00 |
| | | | | 343/788 |
| 2011/0109311 A1* | 5/2011 | Walsh | ............... | G01R 33/36 |
| | | | | 324/309 |
| 2011/0193418 A1* | 8/2011 | Hennig | ............... | A61B 5/0031 |
| | | | | 307/104 |
| 2011/0210824 A1* | 9/2011 | Stewart | ............... | H01Q 1/00 |
| | | | | 340/10.1 |
| 2012/0021687 A1* | 1/2012 | Parker | ............... | H01Q 3/2611 |
| | | | | 455/63.1 |
| 2012/0147790 A1* | 6/2012 | Khojastepour | ...... | H01Q 3/2605 |
| | | | | 370/277 |
| 2012/0212343 A1* | 8/2012 | Grunenberg | ....... | G06K 7/10356 |
| | | | | 340/10.5 |
| 2013/0270342 A1* | 10/2013 | Koyama | ............ | G06K 7/10178 |
| | | | | 235/439 |
| 2014/0118116 A1* | 5/2014 | Lavedas | ............... | H01Q 7/00 |
| | | | | 340/10.3 |
| 2014/0253119 A1* | 9/2014 | Walsh | ............... | G01V 3/32 |
| | | | | 324/309 |
| 2024/0042809 A1* | 2/2024 | Compton | ............ | H01Q 1/2241 |

* cited by examiner

TIRE PRESSURE MONITOR COMMUNICATION SYSTEM, ELECTROMAGNETIC TRANSMISSION SYSTEM HAVING CANCELLATION AND AN ANTENNA ASSEMBLY FOR USE THEREWITH AND METHODS

CROSS-REFERENCE TO RELATED APPLICATION

N/A

BACKGROUND OF THE DISCLOSURE

1. Field of the Disclosure

The disclosure relates in general to a communication system, and more particularly, to a tire pressure monitor (TPM) communication system. The system and the components thereof are not limited for use in association with tire pressure monitors, or with automotive applications as a whole. Additionally, an antenna assembly is likewise disclosed.

2. Background Art

As vehicles become increasingly complex, monitors, sensors and communication systems become more commonly included with new vehicles. One such example is a tire pressure monitoring system. In such systems, individual tire pressure monitors, typically coupled to a stem of the tire, are electronically coupled to the vehicle computer system, wherein the vehicle can monitor the tire pressure of each of the tires on the vehicle.

During manufacture, or sensor replacement, it is generally necessary to establish communication between the tire pressure monitor and the vehicle computer system. In some instances, this requires programming the vehicle with the unique identifier of the tire pressure monitor so that the vehicle understands which tire pressure monitors are associated with the vehicle, and where the particular monitor is positioned (i.e., where the tire is on the vehicle).

To program such information, electromagnetic waves (typically in the form of low frequency signals) can be sent to the tire pressure monitor. This "wakes up" the tire pressure monitor and causes the tire pressure monitor to transmit a "response" signal (typically in the form of a UHF signal) providing information pertaining to the tire pressure monitor for purposes of programming (or providing other equipment). In other configurations, a signal that is sent to the tire pressure monitor may comprise a consistent signal, or may comprise a modulated signal.

In many instances, conventional systems rely on programming tools that must be positioned into contact with, or in very close proximity to the individual sensor so that communication can be achieved. That is, communication is lost, or cannot be established, at a distance of only a couple of centimeters. On the other hand, if such tools are provided with higher power, the devices emit sufficient signals over sufficient distances that they may violate regulations that are directed to controlling the radiated fields from radio frequency transmitters. Additionally, such tools may undesirably interfere with other signals well beyond the region of use.

SUMMARY OF THE DISCLOSURE

The disclosure is directed to a tire pressure monitoring system, in one aspect. The tire pressure monitoring system is configured to communicate with a tire pressure sensor. The tire pressure monitoring system includes an antenna assembly and a transmitter. The antenna assembly has a transmitting antenna and a cancelling antenna. The transmitting antenna has a wire loop defined by a plurality of coils with a first terminal and a second terminal. The cancelling antenna has a wire loop defined by a plurality of coils with a first terminal and a second terminal. The arrangement of the transmitting antenna and the cancelling antenna defines a proximal zone wherein the field from the transmitting antenna is configured to be sufficient to actuate the tire pressure monitor, while beyond the proximal zone, the field from the cancelling antenna cancels the field from the transmitting antenna. The transmitter is coupled to the first terminal and the second terminal of the transmitting antenna, and the first terminal and the second terminal of the cancelling antenna.

In some configurations, the plurality of coils of the transmitting antenna defines an internal region. The proximal zone ends within 60 cm of the transmitting antenna within a projection of the internal region in a transmitting direction.

In some configurations, the transmitting antenna and the cancelling antenna are configured to transmit a signal at between 30 kHz and 300 kHz.

In some configurations, the cancelling antenna surrounds the transmitting antenna.

In some configurations, the transmitting antenna comprises a circular configuration and the cancelling antenna comprises a circular configuration, and wherein the transmitting antenna and the cancelling antenna are concentric.

In some such configurations, the transmitting antenna has a diameter of at least 600 mm and the cancelling antenna is radially outwardly spaced from the transmitting antenna at least 50 mm.

In some configurations, the antenna assembly further includes at least one ferrite layer positioned on one side of the transmitting antenna and the cancelling antenna.

In some configurations, the antenna assembly further includes at least one metal layer positioned on a side of the at least one ferrite layer opposite the transmitting antenna and the cancelling antenna so as to sandwich the at least one ferrite layer between the at least one metal layer and each of the transmitting antenna and the cancelling antenna.

In some configurations, the cancelling antenna comprises a first cancelling antenna positioned to a first side of the transmitting antenna and a second cancelling antenna positioned to a second side of the transmitting antenna.

In some configurations, the first cancelling antenna and the second cancelling antenna are substantial mirror images of each other taken about an axis bisecting the transmitting antenna.

In some configurations, the internal region of the transmitting antenna is larger than a transmitting region of either of the first cancelling antenna and the second cancelling antenna.

In some configurations, the transmitting antenna comprises one of a rectangular and square configuration having sides that are at between 100 mm and 1500 mm.

In some configurations, an internal region of at least one of the first cancelling antenna and the second cancelling antenna is less than one half the internal region of the transmitting antenna.

In some configurations, the internal region of at least one of the first cancelling antenna and the second cancelling antenna is less than one third the internal region of the transmitting antenna.

In some configurations, the first cancelling antenna and the second cancelling antenna each have an internal region with the internal region of the first cancelling antenna and the internal region of the second cancelling antenna being the same.

In some configurations, the first cancelling antenna and the second cancelling antenna are coplanar.

In some configurations, the transmitting antenna is coplanar with the first cancelling antenna and the second cancelling antenna.

In some configurations, the tire pressure monitoring system further includes a receiver configured to receive a signal from a tire pressure monitor.

In another aspect of the disclosure, the disclosure is directed to an antenna assembly having a transmitting antenna and a cancelling antenna. The transmitting antenna has a wire loop defined by a plurality of coils with a first terminal and a second terminal. The cancelling antenna has a wire loop defined by a plurality of coils with a first terminal and a second terminal. The arrangement of the transmitting antenna and the cancelling antenna defines a proximal zone wherein the field from the transmitting antenna is configured to be sufficient to actuate a sensor, while beyond the proximal zone, the field from the cancelling antenna cancels the field from the transmitting antenna.

In some configurations, the transmitting antenna and the cancelling antenna are configured to transmit a signal 180° out of phase.

In some configurations, the proximal zone ends within 60 cm.

In yet another aspect of the disclosure, the disclosure is directed to a method of transmitting a signal to a tire pressure monitor comprising the steps of: providing an antenna assembly having a transmitting antenna and a cancelling antenna, wherein the antenna assembly defines a proximate zone wherein the field from the transmitting antenna is sufficient to actuate a tire pressure monitor, and wherein outside of the proximate zone the field from cancelling antenna and the field from the transmitting antenna cancel each other; placing a tire pressure monitor within the proximate zone, while being spaced apart from the antenna assembly; emitting a field from each of the transmitting antenna and the cancelling antenna; and actuating the tire pressure monitor.

In some configurations, the method further comprises the step of not actuating a second tire pressure monitor that is positioned outside of the proximate zone.

In some configurations, the tire pressure monitor is spaced apart from the antenna between 5 cm and 60 cm, and more preferably between 5 cm and 20 cm.

In some configurations, the method further comprises the step of receiving a signal from the tire pressure monitor after the step of actuating the tire pressure monitor.

BRIEF DESCRIPTION OF THE DRAWINGS

The disclosure will now be described with reference to the drawings wherein.

DETAILED DESCRIPTION OF THE DISCLOSURE

Figure 1:
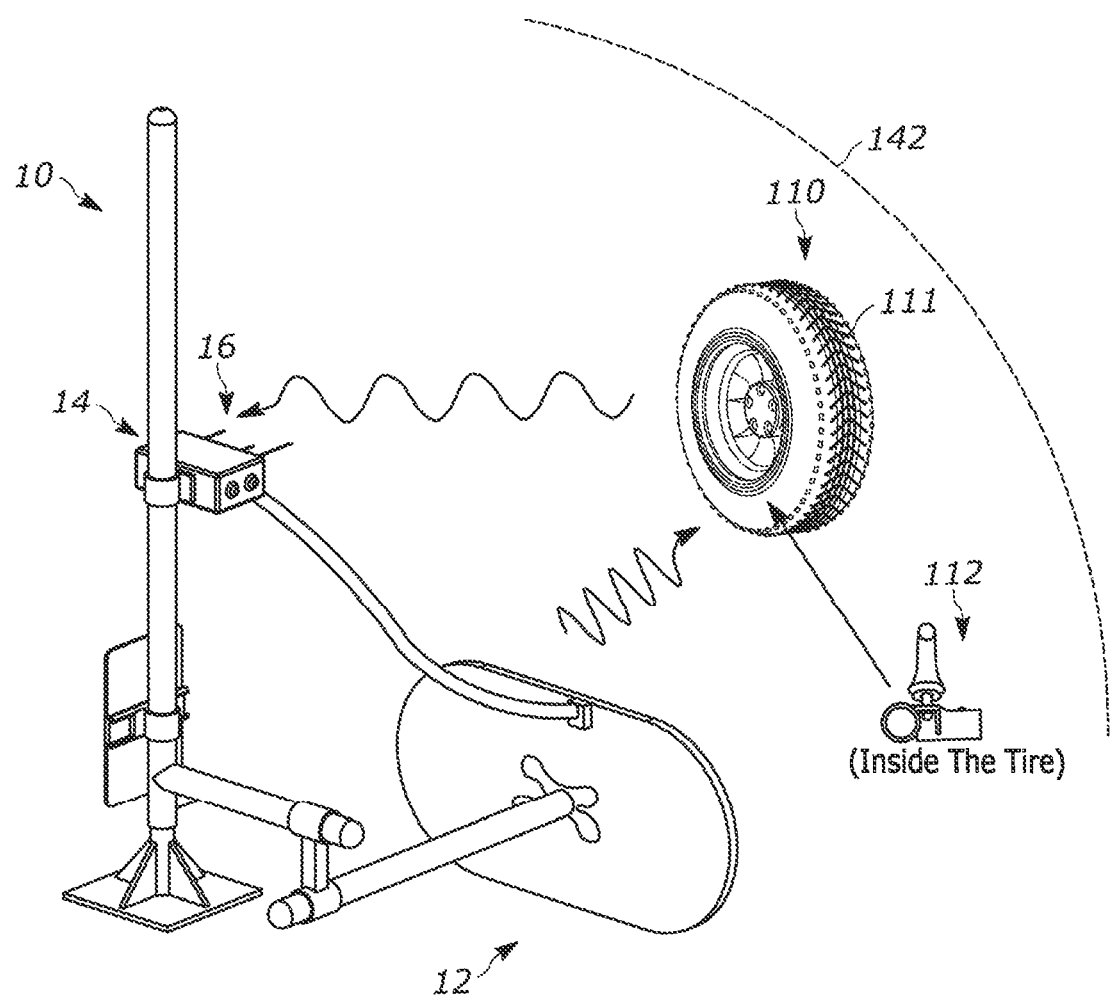
FIG. 1 of the drawings is a perspective schematic configuration of the system of the present disclosure, showing, as well, a method of operation thereof.
Figure 2:
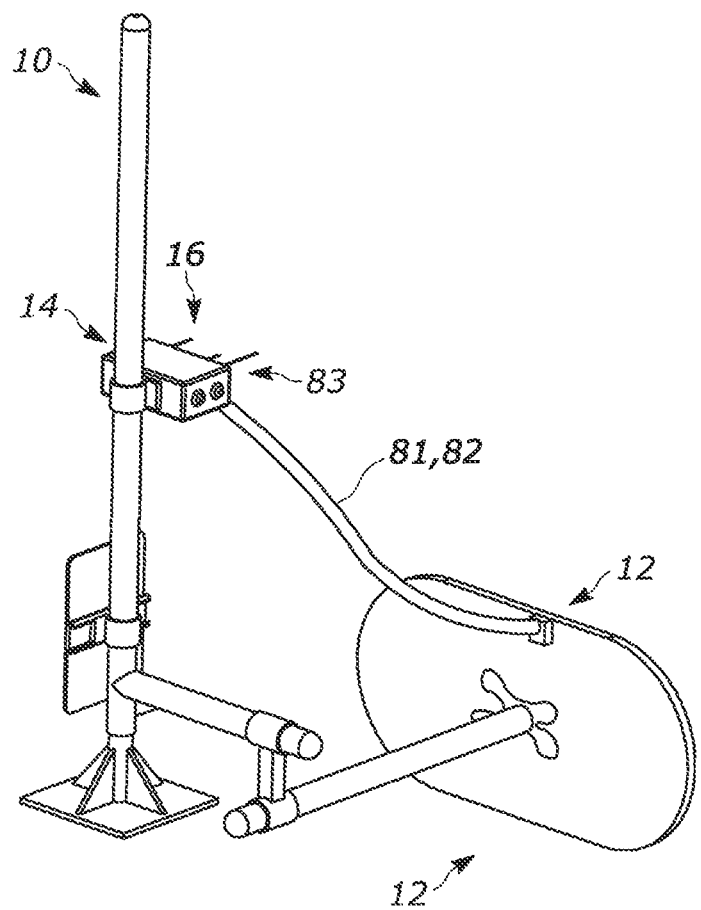
FIG. 2 of the drawings is a perspective view of a configuration of the system of the present disclosure.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 12:
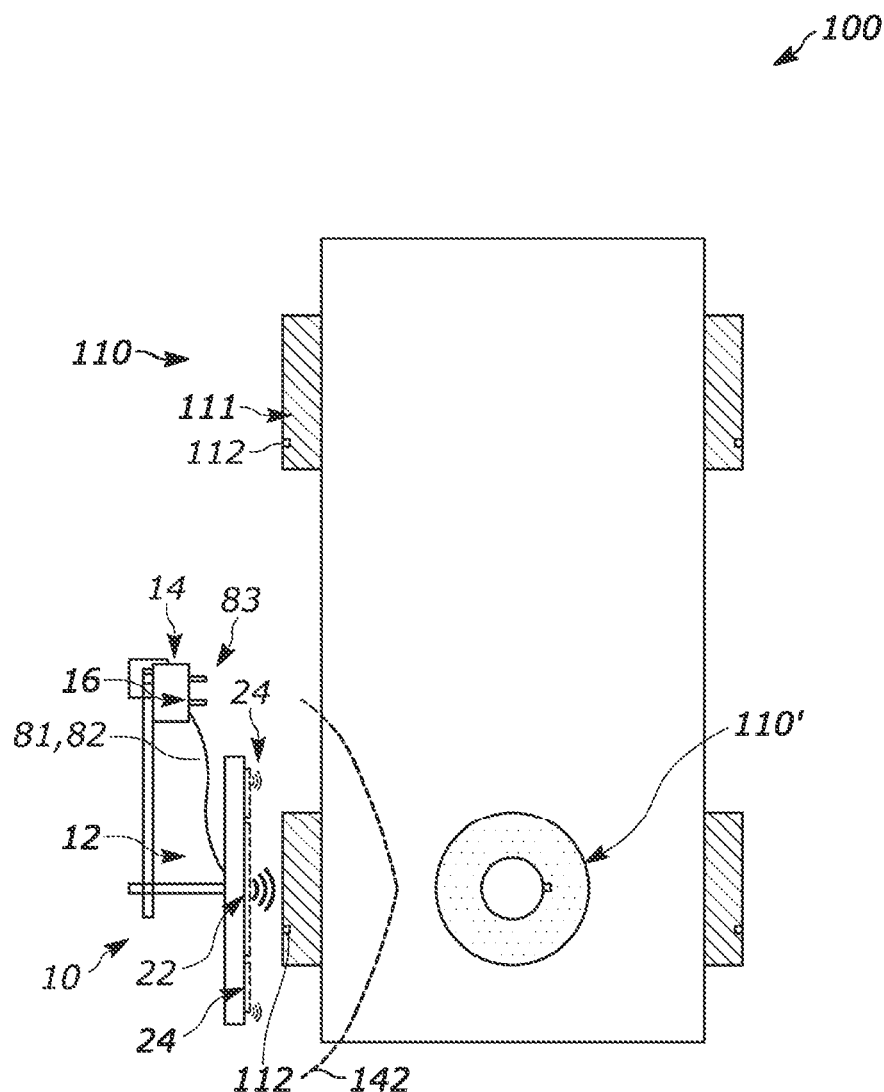
FIG. 12 of the drawings is a schematic representation of a method of operation of the system of the present disclosure.

Referring now to the drawings and in particular to FIG. 1, the tire pressure monitoring system is shown generally at 10. The system 10, in the embodiment disclosed, is configured for use in association with the communication with and, preferably, programming of, tire pressure monitors that are associated with the tire of a vehicle. It will be understood that the system is configured for use in association with a vehicle 100 (FIG. 12) having a plurality of wheels 110 having tires 111 and tire pressure monitors 112 mounted thereto. Typically, a vehicle will have two (i.e., motorcycle), three (i.e., tricycle), four or more (i.e., car, truck) wheels upon which the vehicle travels on a roadway, plus, in some configurations, additional spare tires. Each of these wheels may include a tire pressure monitor mounted thereto. It will be understood that the system can be utilized to communicate with any number of different systems that have communication protocols that are analogous to the tire pressure monitor, without regard to the particular type of sensor, or the environment of such a sensor. In such a configuration, it will be understood that the system is one of an electromagnetic transmission system having cancellation (wherein the transmission may be in one direction or may comprise communication).

The present system is configured to be used with a single wheels/tire/tire pressure monitor that is not mounted to a vehicle, as well as with a vehicle having multiple wheels/tires/tire pressure monitors that may be attached to a vehicle (such as, for example, on a vehicle assembly line or a vehicle repair center. With additional reference to FIG. 12, an exemplary vehicle 100 is shown having a plurality of wheels 110, each of which includes a tire pressure monitor 112. This configuration is deemed to be exemplary and is not to be limiting the system or a method of use thereof.

The system 10 includes antenna assembly 12, transmitter 14 and receiver 16. With further reference to FIGS. 4-7, the antenna assembly 12 includes housing 20, transmitting antenna 22, cancelling antenna 24, ferrite layer 26 and metal layer 28. The antenna housing generally defines a front side and a back side, and can be shaped so as to match the configuration of the transmitting antenna and the cancelling antenna positioned therein. The front side and the back side are generally parallel to each other and are generally planar configurations, while there can be variations. The front side and the back side may be formed from, for example a molded polymer or composite material, while other materials, such as metals are contemplated for use.

The housing may include structures, such as threaded bores, clips or the like, so as to be attachable to an outside structure, such as a frame or stand. One such structure may comprise a plurality of openings that match the VESA standard, while other configurations are likewise contemplated, such as slots and tabs as well as other mounting configurations.

The transmitting antenna 22 includes wire loop 40 which is defined by coils 41 having a first terminal 42 and a second terminal 43. The coils 41 comprise a number of windings that together define a perimeter 44 and an internal region 45. The precise number of coils and the size and shape of the perimeter 44 and internal region 45 can be varied depending on the particular intended use of the system. In the configuration shown, the coils may have between 2 and 40 coils, or more. Additionally, in the configuration shown, the coil defines a generally square coil having equal sides (with rounded corners). The length of the sides can be varied between, for example, 100 mm and 1500 mm, while both larger and smaller sizes are contemplated. It will additionally be understood that while a square configuration is shown, other shapes, such as rectangular, circular, oval, racetrack, elliptical, polygonal, non uniform, among others is likewise contemplated. The configuration defines a perimeter 44 and also defines an internal region of a particular shape and size. As will be understood, variation of the perimeter and the shape and size of the internal region can affect the distance at which sufficient cancellation occurs (as can other parameters, such as the number of coils, and the relative placement of coils).

The coils 41 terminate at two ends, namely a first terminal 42 and a second terminal 43. In the configuration shown, the first and second terminal are spaced apart from each other, centered about the upper end of the coil 41. Of course, other positions for the first terminal 42 and second terminal 43 are likewise contemplated.

While a single transmitting antenna is shown, it is contemplated that in certain configurations multiple transmitting antenna may be utilized.

The at least one cancelling antenna 24 comprises, in the configuration shown in FIG. 4 through 7, a first wire loop 50 positioned to one side of the wire loop 40 of the transmitting antennal 22, and a second wire loop 60 positioned on the opposite side of the wire loop 40 from the first wire loop 50. In the configuration shown, the first and second wire loops are generally mirror images of each other taken about an axis vertically bisecting the transmitting antenna. It will be understood that in other configurations, additional antenna may be utilized that are located at other positions, such as, for example, above and/or below, or in alternate configurations about the transmitting antenna. Additionally, as will be explained with respect to an alternate configuration, and as is shown in FIG. 8 through FIG. 11, the cancelling antenna may be positioned to surround the primary antenna (i.e., concentric circles, among other shapes and relative positionings).

Figure 6:
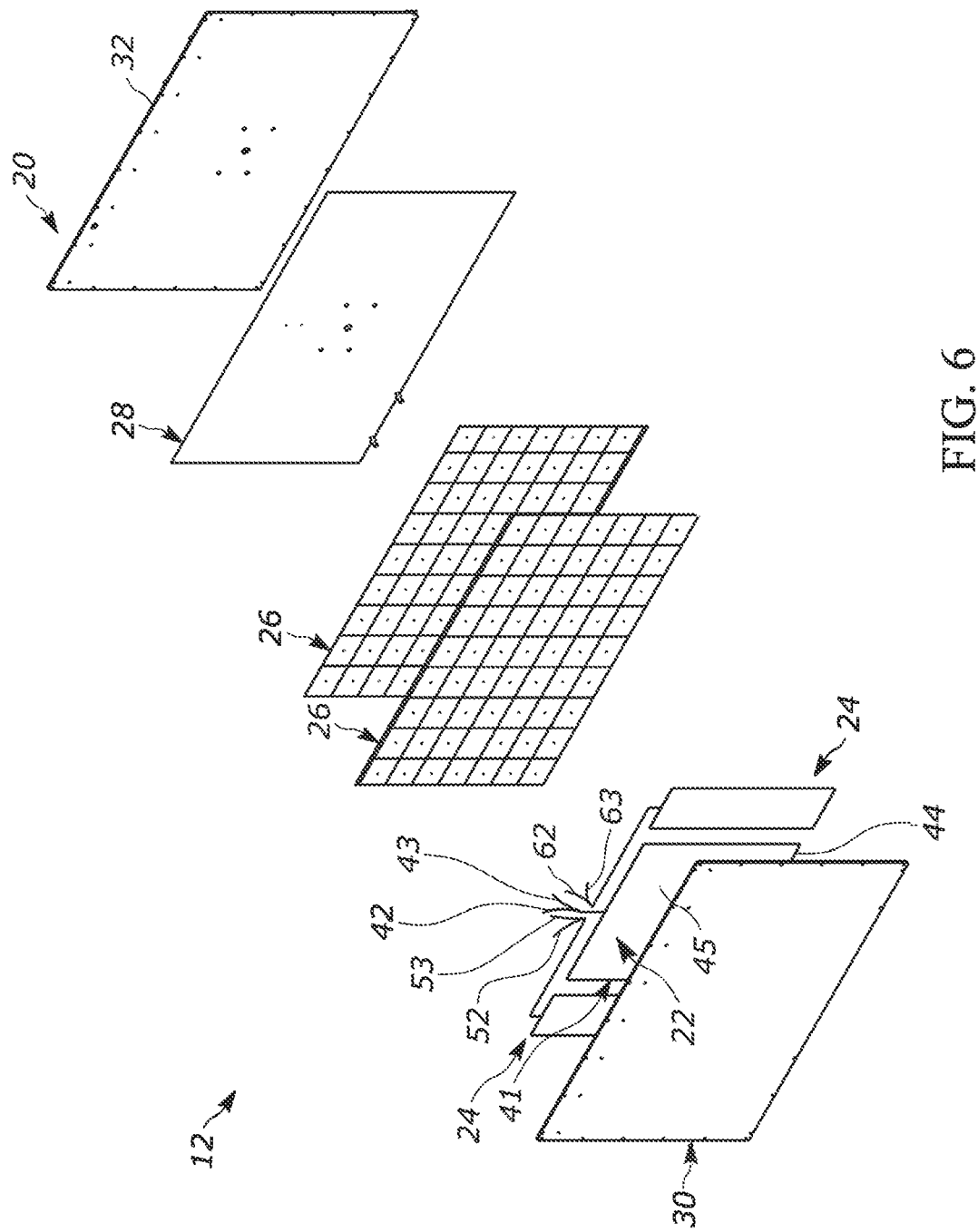
FIG. 6 of the drawings is an exploded perspective view of a configuration of the antenna assembly of the system of the present disclosure.
Figure 7:
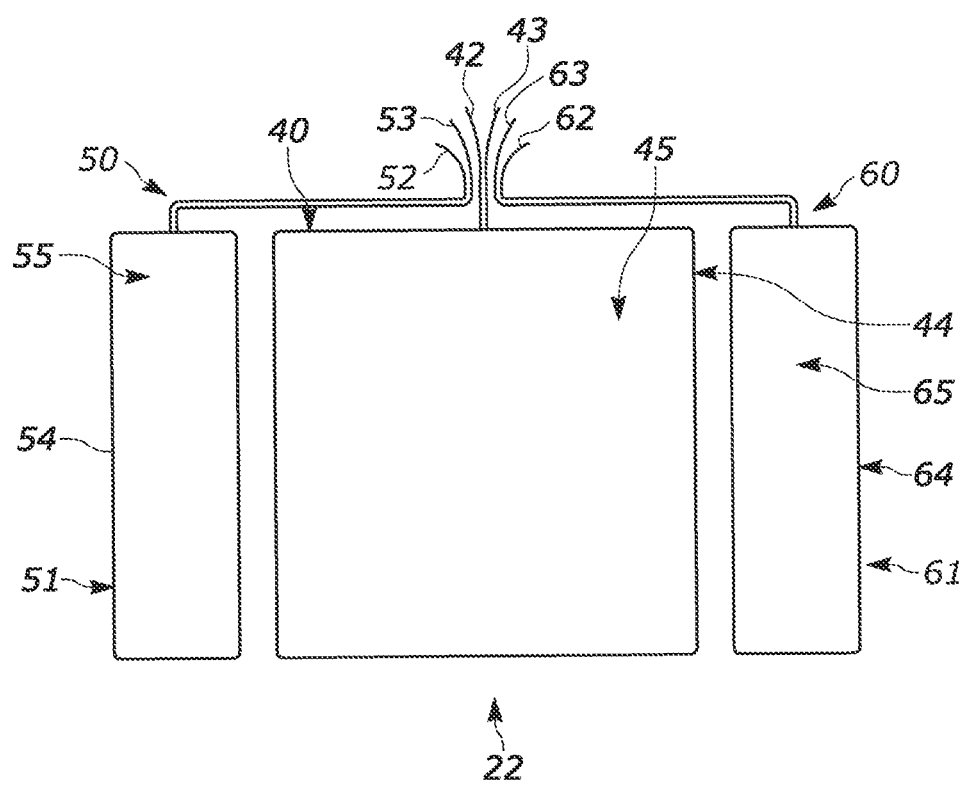
FIG. 7 of the drawings is a front plan view of a configuration of the transmitting antenna and the cancelling antenna for an antenna assembly of the system of the present disclosure.
Figure 8:
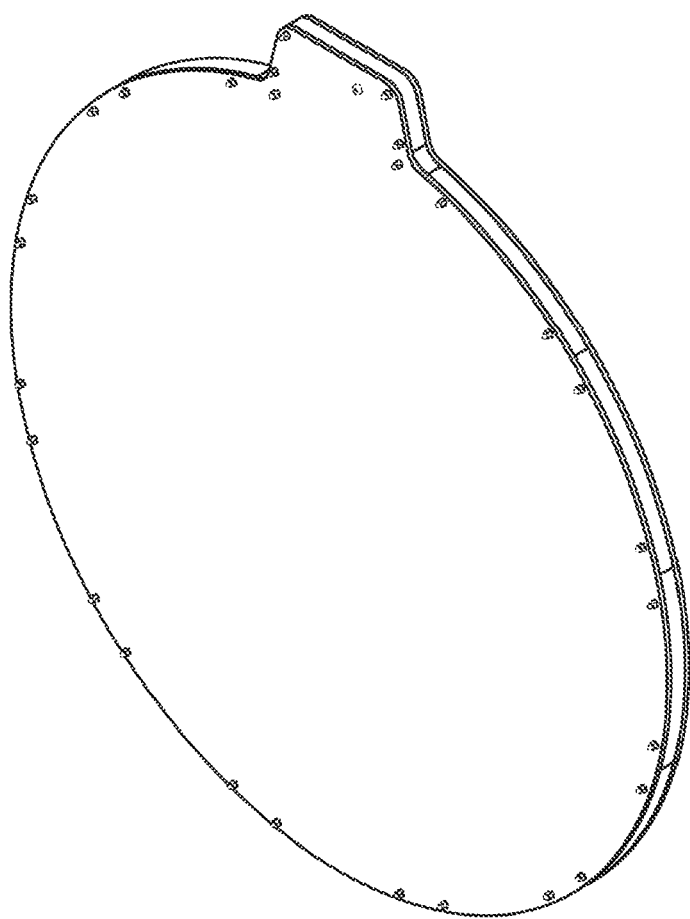
FIG. 8 of the drawings is a front perspective view of another configuration of the antenna assembly of the system of the present disclosure.
Figure 9:
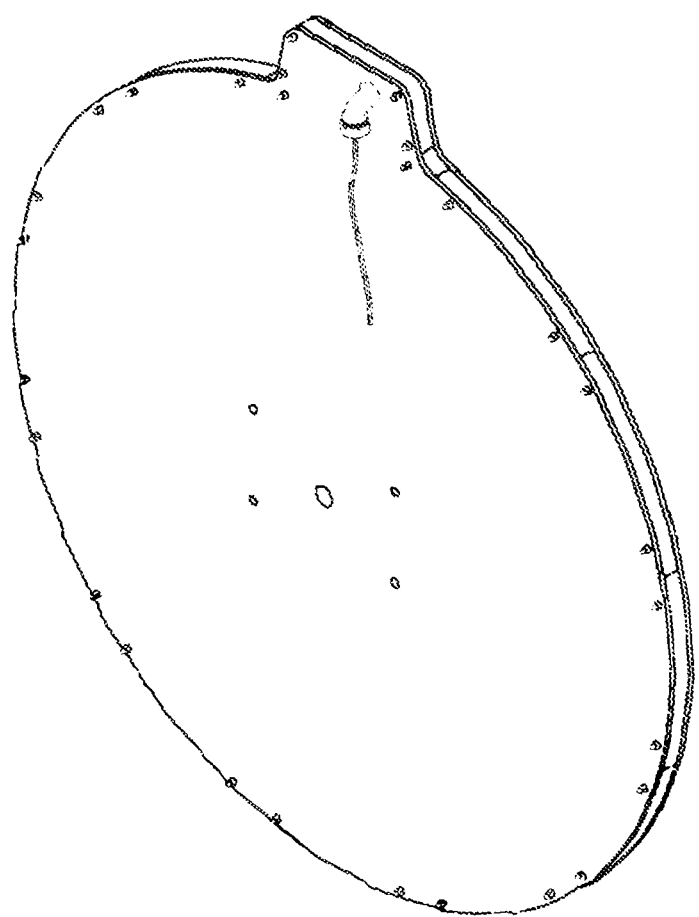
FIG. 9 of the drawings is a back perspective view of another configuration of the antenna assembly of the system of the present disclosure.
Figure 10:
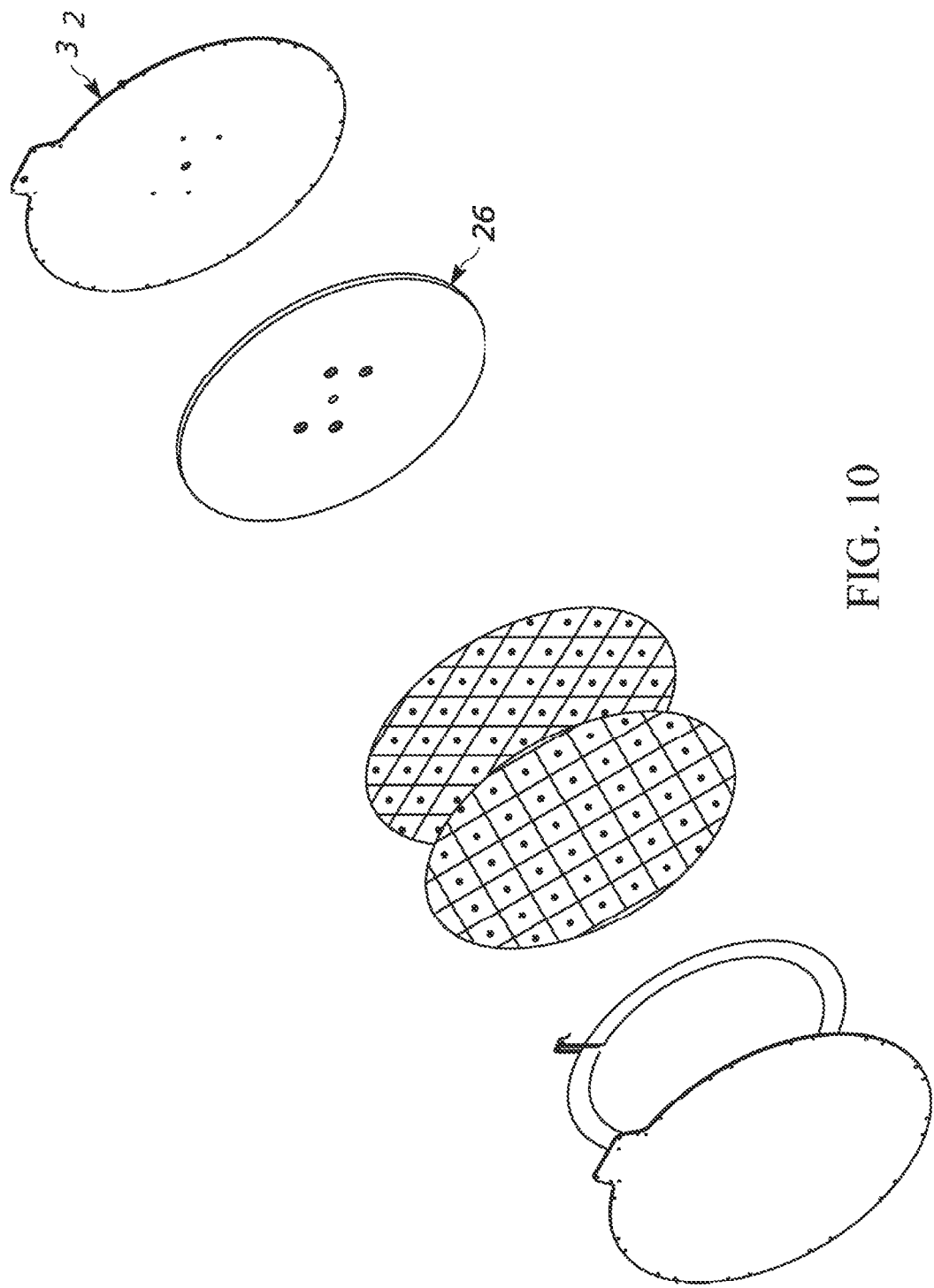
FIG. 10 of the drawings is an exploded perspective view of another configuration of the antenna assembly of the system of the present disclosure.
Figure 11:
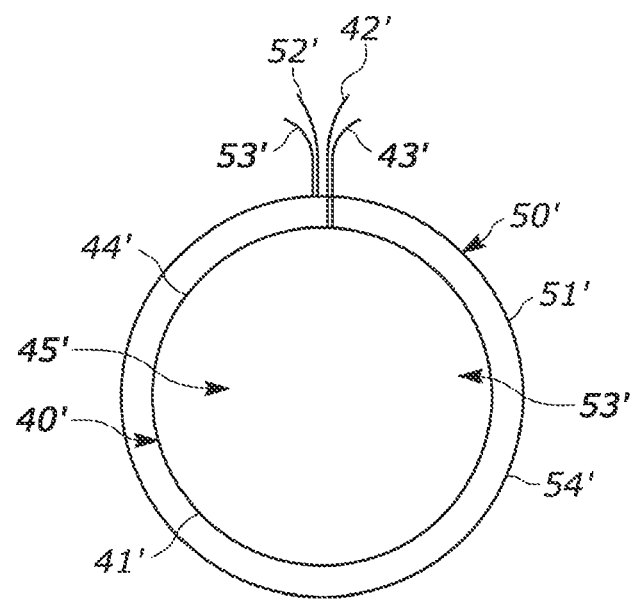
FIG. 11 of the drawings is a front plan view of a configuration of the transmitting antenna and the cancelling antenna for an antenna assembly of the system of the present disclosure.

In the configuration of FIG. 4 through FIG. 7, and with particular reference to FIG. 7, the wire loop 50 includes coils 51, first terminal 52, second terminal 53. In the configuration shown, the coils 51 comprise a number of windings that together define a perimeter 54 and an internal region 55 (much like the coils 41). The precise number of coils and the size and shape of the perimeter 54 and internal region 55 can be varied depending on the particular intended use of the system. In the configuration shown, the coils may have between 2 and 40 coils, or more (and may have a greater or fewer number of coils than the coils 41 or coils 61). Additionally, in the configuration shown, the coil defines a generally rectangular coil having a height that is similar to the height of the coils 41 (with rounded corners). The length of the sides can be varied between, for example, 100 mm and 1500 mm, while both larger and smaller sizes are contemplated. In the configuration shown, the height of the cancelling antenna is similar to that of the primary antenna, while the width of the cancelling antenna is smaller than that of the transmitting antenna, and, in the configuration shown, less than a third width of the transmitting antenna (while in other configurations, they may be less than half the width. As such, the resulting internal region of the cancelling coils may be less than one third that of the transmitting coil, or less than one half that of the transmitting coil. In other configurations, they may have differences in multiple dimensions. It will additionally be understood that while a rectangular configuration is shown, other shapes, such as square, circular, oval, racetrack, elliptical, polygonal, non uniform, among others is likewise contemplated. The configuration defines a perimeter 54 and also defines an internal region of a particular shape and size. As will be understood, variation of the perimeter and the shape and size of the internal region can affect the distance at which sufficient cancellation of the signal from the transmitting antenna by the cancelling antenna occurs (as can other parameters, such as the number of coils, and the relative placement of coils).

The coils 51 terminate at two ends, namely a first terminal 52 and a second terminal 53. In the configuration shown, the first and second terminal are spaced apart from each other, centered about the upper end of the coil 51. Of course, other positions for the first terminal 52 and second terminal 53 are likewise contemplated.

In the configuration shown, the second wire loop 60 of the cancelling antenna 24, as noted above, comprises an identical configuration (although the invention is not limited thereto), the second wire loop 60 will not be described in detail, with the understanding that the structures are similar to the wire loop 50. Similar structures have the same reference numbers augmented by ten. Specifically, wire loop

60 includes coils 61 terminating in first terminal 62 and second terminal 63. The wire loop defines a perimeter 64 and an internal region 65.

Preferably, the transmitting antenna and the cancelling antenna are coplanar. While other configurations are contemplated, the configuration shown has the transmitting antenna as well as the cancelling antenna as being coplanar.

An alternative is shown in the configuration of FIG. 8 through FIG. 11, wherein the transmitting antenna 22 comprises a generally circular wire loop 40'. The cancelling antenna 24 comprises a generally circular wire loop 50' which surrounds the circular wire loop 40'. In the configuration shown, the circular wire loop 50' is axially spaced apart from the circular wire loop 40' and is substantially concentric thereto. In other configurations, the shapes of the wire loop 40' and the wire loop 50' may not be concentric, and, the two wire loops may be of different configuration. The remaining structures which are substantially identical in function are labeled with the same reference numbers as those in FIGS. 4 through 7, augmented with a prime ('). Preferably, the transmitting antenna and the cancelling antenna are coplanar, or in planes that are substantially parallel to each other, while either the transmitting antenna or the cancelling antenna may be mounted in such a manner that they are on planes that are oblique to each other.

In some such configurations, the transmitting and the cancelling antenna may be separated by a radial distance of, for example, 100 mm. It is contemplated that, for example, the transmitting antenna may have a diameter of between 100 mm and 1000 mm, with the cancelling antenna being separated a radial distance of 20 mm or more. In some configurations, the radius of the transmitting antenna may be larger than 600 mm with the radius of the cancelling antenna being more than 70 mm larger. In other configurations, the transmitting antenna may be larger than 700 mm with the radius of the canceling antenna being more than 100 mm larger. The foregoing is not to be deemed limiting, but, rather, is meant to provide examples.

I the configurations shown, the transmission from the transmitting antenna is 180° out of phase relative to the transmission from the cancelling antenna, such that the signals cancel each other. However, due to the relative positioning, such cancelling occurs to a significant extent beyond the proximal zone.

With reference to FIG. 6 (as well as to FIG. 10) at least one ferrite layer, such as ferrite layer 26, may be positioned behind each of the wire loops of the transmitting antenna 22 and the cancelling antenna 24 (i.e., between the wire loops and the back of the housing). In some configurations, multiple ferrite layers may be utilized. The ferrite layer redirects the magnetic field in the direction of the front of the housing so as to increase the energy directed in such direction (i.e., the transmitting direction). In the configuration contemplated, one or more ferrite layers is contemplated, wherein the entirety of the coils of the transmitting antenna and cancelling antenna may fit within the footprint of one or more of the layers, and wherein the layers may be identical or may be different from each other in coverage/footprint.

Similarly, the at least one metal layer 28 comprises at least one metal sheet (which may be in the form of a relatively thin foil layer). The metal layer 28 is positioned between the ferrite layer 26 and the back of the housing 20. The metal layer may be sized so that the coils of the transmitting antenna and the cancelling antenna fit within the footprint of the metal layer. Additionally, the ferrite layer may also fit within the footprint of the metal layer. The metal layer reduces nearby electric fields in both the intended and unintended direction of the magnetic field. Additionally, through positioning of the metal layer so that the ferrite layer is between the coils and the metal layer, the magnetic field is directed away from the metal sheet so that the field does not dissipate magnetic energy through the creation of eddy currents in the sheet.

The transmitter 14, as will be understood includes transmitting output terminals 81 as well as cancelling output terminals 82. The transmitting output terminals 81 are coupled to the first and second terminals 42, 43. The cancelling output terminals 82 are coupled to the terminals 52, 53 (and where there is a second (or multiple) cancelling wire loops, terminals 62, 63). The transmitter is configured to transmit a signal (and a cancelling signal) at a frequency, preferably a frequency between 30 kHz and 300 kHz, and more preferably at about 125 kHz. As will be understood the current transmitted through the transmitting antenna is out of phase with the current transmitted through the cancelling antenna so that in a distal zone, the transmissions cancel each other. However, and as will be explained below, in a proximal zone the end of which is delineated by the dashed line, schematically in FIGS. 1 and 12 (which may be for example between 0 cm and 60 cm) a sensor (such as a tire pressure monitor) positioned in front of the transmitting antenna will receive the transmitting antenna signal sufficient to engage in communication (that is, the signal will not be cancelled in the proximal zone to preclude communication).

The receiver 16 is shown as including antenna 83 which is capable of receiving a signal from the sensor (in the embodiment shown, the tire pressure monitor) which sensor has been actuated or activated into transmitting by the transmitter 14 transmitting through the transmitting antenna 22. In the configuration shown, the receiver 16 is configured to receive a signal, preferably in the UHF region and, more preferably at 315 MHz and 433 MHz. Of course, other ranges and other frequencies are contemplated, with the understanding that the particular sensors (tire pressure monitors) are contemplated for use therewith.

The transmitter and receiver can be coupled to a computing device or may be unitized along with a computing device (which may be coupled to another computing device, such as, for example a specific purpose device, or a tablet or phone communicating through wifi or Bluetooth, for example). In some configurations, the computing device comprises a general purpose computer, which is described hereinbelow. It will be understood that a general purpose computer may comprise a specialized device that is configured solely to communicate with and to program tire pressure monitors. In other configurations such a computing device may have programming functions and diagnostic functions such as, for example, of a model TPMS5 that is offered by Snap-On Incorporated of Kenosha, Wisconsin, the specifications of which are hereby incorporated by reference.

Figure 13:
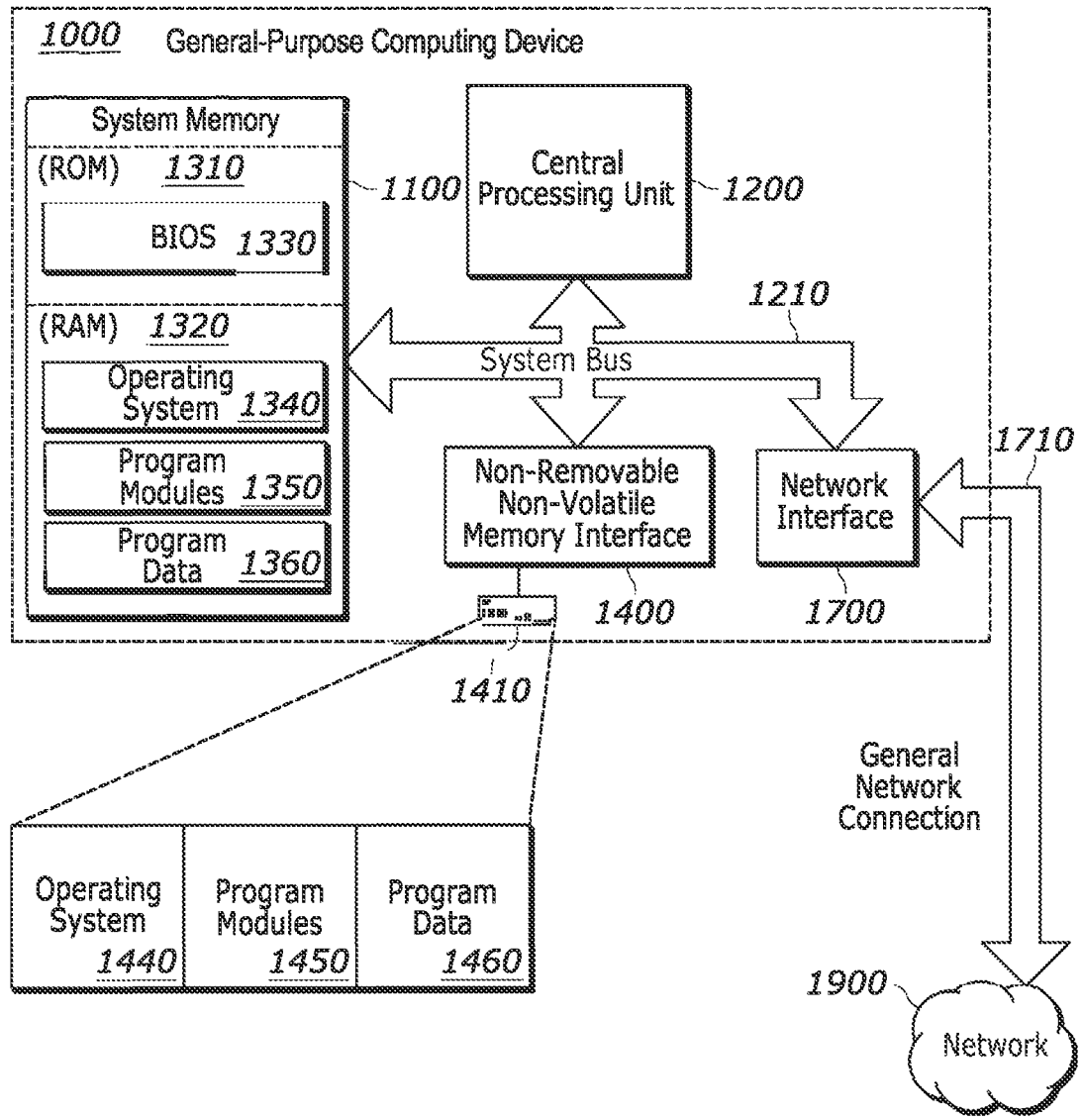
FIG. 13 is an schematic representation of a general purpose computing device.

With reference to FIG. 13, an exemplary general-purpose computing device is illustrated in the form of the exemplary general-purpose computing device 1000. The general-purpose computing device 1000 may be of the type utilized for coupling to and directing the transmitter and receiver (and controlling the communication, programming and operation of the system). As such, it will be described with the understanding that variations can be made thereto. The exemplary general-purpose computing device 1000 can include, but is not limited to, one or more central processing units (CPUs) 1200, a system memory 1300, such as including a Read Only Memory (ROM) 1310 to store a Basic Input/Output System (BIOS) 1330 and a Random Access Memory (RAM) 1320, and a system bus 1210 that couples various system components including the system memory to the processing unit 1200. The system bus 1210 may be any of several types of bus structures including a memory bus or memory controller, a peripheral bus, and a local bus using any of a variety of bus architectures. Depending on the specific physical implementation, one or more of the CPUs 1200, the system memory 1300 and other components of the general-purpose computing device 1000 can be physically co-located, such as on a single chip. In such a case, some or all of the system bus 1210 can be nothing more than communicational pathways within a single chip structure and its illustration in FIG. 3 can be nothing more than notational convenience for the purpose of illustration.

The general-purpose computing device 1000 also typically includes computer readable media, which can include any available media that can be accessed by computing device 1000. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the general-purpose computing device 1000. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

Figure 3:
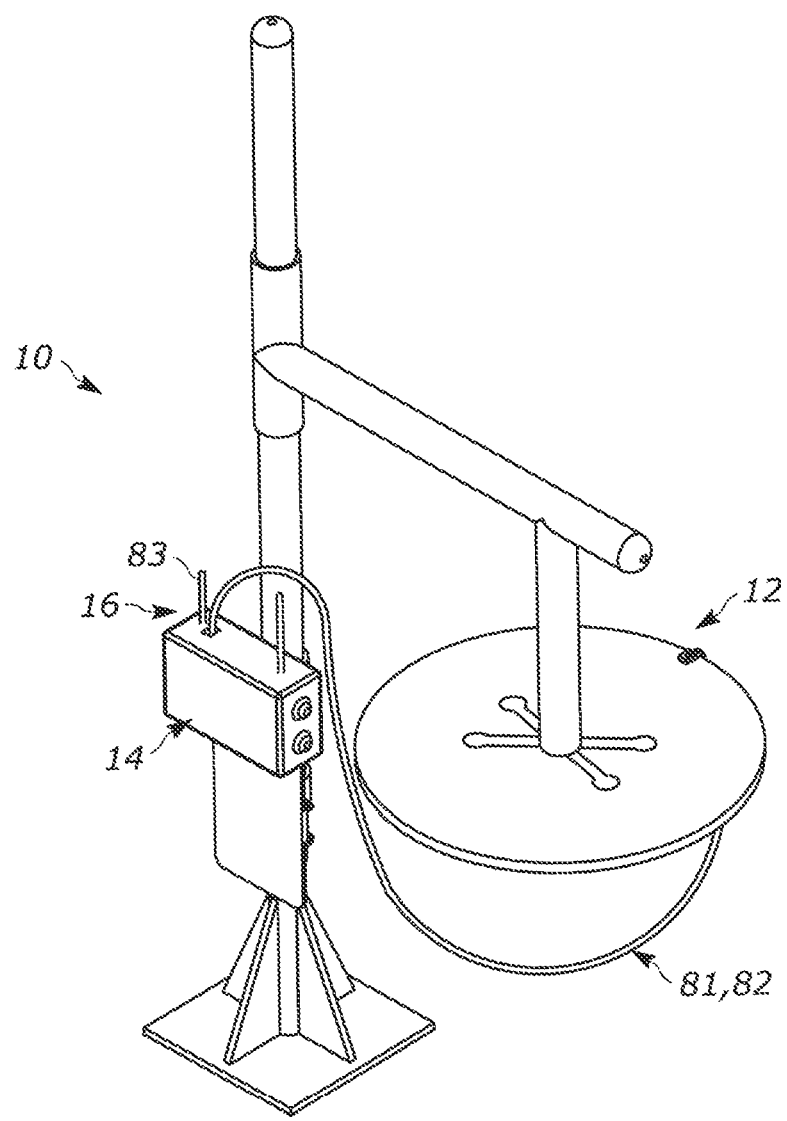
FIG. 3 of the drawings is a perspective view of another configuration of the system of the present disclosure.
Figure 4:
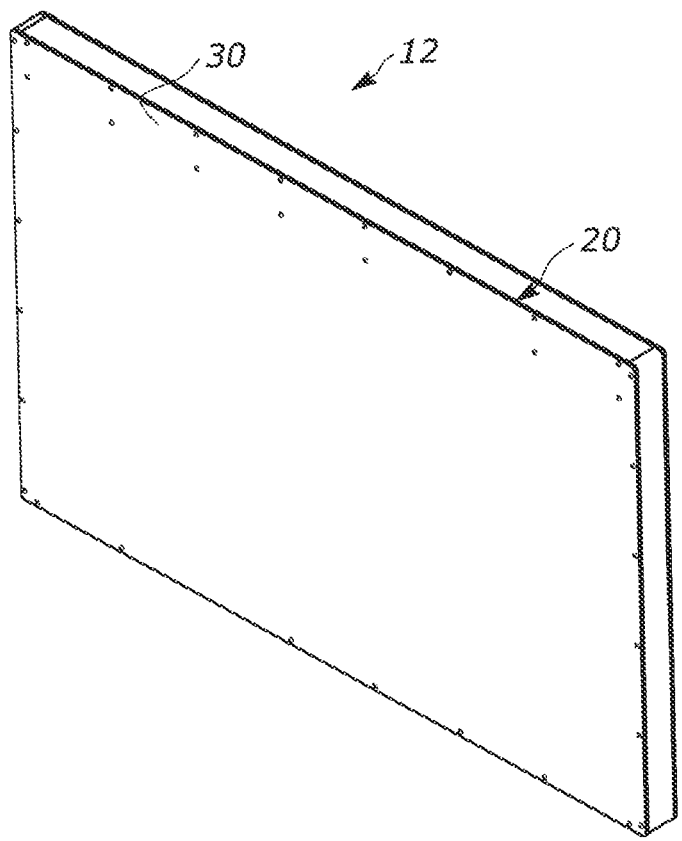
FIG. 4 of the drawings is a front perspective view of a configuration of the antenna assembly of the system of the present disclosure.
Figure 5:
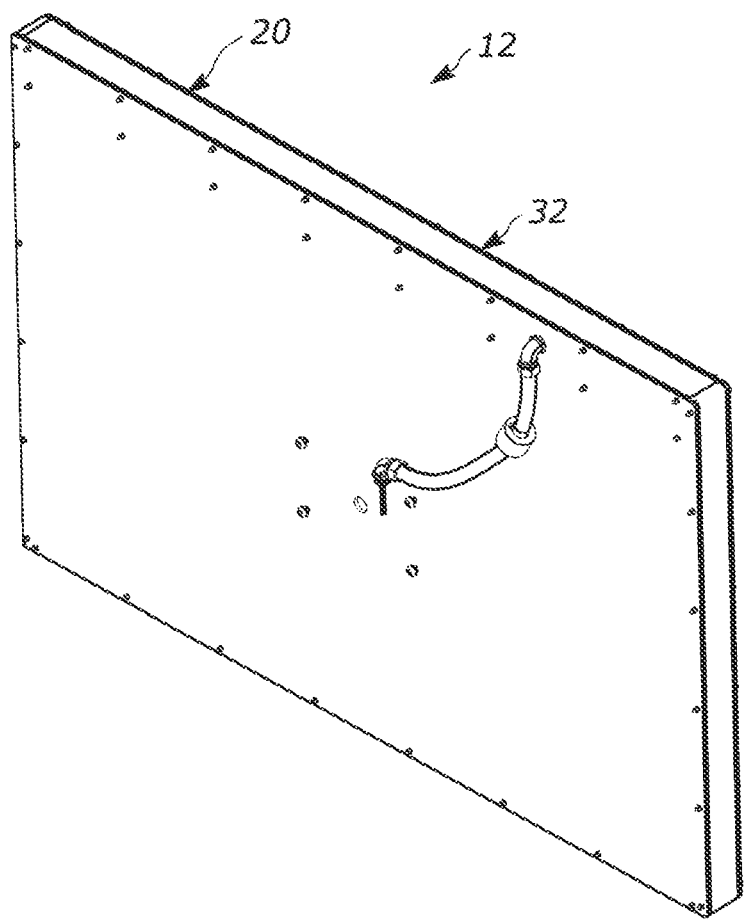
FIG. 5 of the drawings is a back perspective view of a configuration of the antenna assembly of the system of the present disclosure.

When using communication media, the general-purpose computing device 1000 may operate in a networked environment via logical connections to one or more remote computers. The logical connection depicted in FIG. 3 is a general network connection 1710 to the network 1900, which can be a local area network (LAN), a wide area network (WAN) such as the Internet, or other networks. The computing device 1000 is connected to the general network connection 1710 through a network interface or adapter 1700 that is, in turn, connected to the system bus 1210. In a networked environment, program modules depicted relative to the general-purpose computing device 1000, or portions or peripherals thereof, may be stored in the memory of one or more other computing devices that are communicatively coupled to the general-purpose computing device 1000 through the general network connection 1710. It will be appreciated that the network connections shown are exemplary and other means of establishing a communications link between computing devices may be used.

The general-purpose computing device 1000 may also include other removable/non-removable, volatile/nonvolatile computer storage media. By way of example only, FIG. 13 illustrates a hard disk drive 1410 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 1410 is typically connected to the system bus 1210 through a non-removable memory interface such as interface 1400.

The drives and their associated computer storage media discussed above and illustrated in FIG. 13, provide storage of computer readable instructions, data structures, program modules and other data for the general-purpose computing device 1000. In FIG. 3, for example, hard disk drive 1410 is illustrated as storing operating system 1440, other program modules 1450, and program data 1460. Note that these components can either be the same as or different from operating system 1340, other program modules 1350 and program data 1360, stored in RAM 1320. Operating system 1440, other program modules 1450 and program data 1460 are given different numbers here to illustrate that, at a minimum, they are different copies.

The operation will be described in association with a vehicle having four wheels wherein the system is utilized to communicate with any one or more of the wheels, when such wheels are in proximity. One such configuration is shown schematically in FIG. 12.

In such a configuration, the antenna assembly 10 is positioned in an operable orientation relative to the vehicle, such that one of the wheels can be positioned so that the tire pressure monitor is in the proximate zone of the antenna assembly. Once in the proximate zone (which is where the antenna assembly is spaced apart from the wheel by approximately 5 cm to 20 cm, while variations are contemplated, which may extend beyond to, for example 40 cm, 45 cm, 50 cm, 55 cm, or 60 cm, without limitation). The antenna is positioned, and configured to have the transmitter 14 transmit the desired signal through the transmitting antenna and the cancelling antenna. In some such configurations, the antenna assembly is oriented vertically such that the signals transmitted are predominantly horizontal. Generally, the sensor (in this case, the tire pressure monitor) is within the footprint of the transmitting antenna, and more particularly within an projection of the transmitting antenna, i.e., within the internal region 45 bound by the perimeter 44. And, preferably, the sensor is closer to the transmitting antenna than to the cancelling antenna. Preferably, the antenna are positioned so that the predominant signal within the proximate zone is from the transmitting antenna, prior to cancellation by the cancelling antenna. As identified above, this can be achieved through the dimensions of the antenna as well as the intensity and arrangement of the antenna relative to each other and relative to the sensor.

As the wheel is positioned within the proximal zone, the signal from the transmitting antenna is of sufficient strength to be received by the tire pressure monitor to activate the same. It will be understood that in the configuration shown, the tire pressure monitor assembly (which includes the sensing equipment and the communication equipment) is on the order of a few centimeters in any dimension (i.e., typically, while not to be limiting, less than 5 cm in any of length, width and height). In addition, with the proximal zone, the cancelling antenna have not cancelled the signal of transmitting antenna, due to the position of the wheel relative to the transmitting antenna and the position of the wheel relative to the cancelling antenna. In the configuration shown, the proximity of the wheel to the transmitting antenna and the position of the cancelling antenna results in sufficient signal from the transmitting antenna reaching the tire pressure monitor.

However, beyond the proximal region (which in the configuration shown, is less than the distance between the transmitting antenna and the wheel 110', the cancelling antenna sufficiently cancel the signal from the transmitting antenna such that any tire pressure monitor in such region can not be activated by the transmitting antenna. At a distance of, for example 30 meters, and preferably prior to 30 meters, the signals from the cancelling antenna cancel the signals from the transmitting antenna so that the field intensity is under the allowed maximum of 1.02 mV/m at 125 KHz.

It will be understood that through adjustments in the number of coils, the perimeters and the shapes of the internal regions, as well as the power transmitted through the wire loops of the transmitting antenna and the cancelling antenna, the proximal zone can be modified so as to be longer or shorter, depending on application. For example, in the vehicle embodiment the proximal zone can be delimited by both the field intensity, with the assurance that only the desired tire pressure monitor is actuated (and not one on the same axle opposite the wheel closest to the antenna.

In another configuration, the system can be configured to communicate with a wheel that is disassociated with a vehicle. In one such configuration, the system can be configured so that the antenna assembly is generally horizontal with the signals being transmitted in predominantly downward direction (i.e., the transmitting direction).

The wheel can be positioned below the antenna (that is, between the antenna and the floor, for example). Activation and communication is generally achieved in a manner similar to that which is set forth above. The proximal zone can be configured so that the proximal zone terminates at a distance from the ground, for example, so that wheels that are laying on the ground and that are in proximity to the antenna assembly are not activated as they are located in the distal zone wherein the signals from the cancelling antenna have cancelled the signals from the transmitting antenna.

That is, outside of the proximal zone, the system is configured to minimize interference with other wireless signals, and to comply with relevant regulations concerning the transmission of signals.

It will be understood that while the system is well suited for use in association with the communication with tire pressure monitors, and can be tailored for use therewith during assembly and/or repair of vehicles, vehicle components and/or tire pressure monitors, the system is not limited for use in association with tire pressure monitors or with vehicles. That is, the system is well suited for use in association with sensors and devices wherein activation and/or communication can be achieved by placing the device within the proximal zone, and wherein cancellation of signals is achieved outside of the proximal zone, within compliance with limitations of governing bodies, such as, for example, the FCC. Thus, the same configurations disclosed above, or configurations that are altered in accordance with the variations that are set forth above are likewise contemplated for use herein in association with sensors and devices that are not tire pressure monitors, and that may or may not be associated with vehicles.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A tire pressure monitoring system configured to communicate with a tire pressure sensor, the tire pressure monitoring system comprising:
   an antenna assembly having:
      a transmitting antenna, the transmitting antenna comprising a wire loop defined by a plurality of coils with a first terminal and a second terminal;
      a cancelling antenna, the cancelling antenna comprising a wire loop defined by a plurality of coils with a first terminal and a second terminal;
      wherein, the arrangement of the transmitting antenna and the cancelling antenna defines a proximal zone wherein a field from the transmitting antenna is configured to be sufficient to actuate the tire pressure monitor, while beyond the proximal zone, a field from the cancelling antenna cancels the transmission from the transmitting antenna;
   a transmitter coupled to the first terminal and the second terminal of the transmitting antenna, and the first terminal and the second terminal of the cancelling antenna.

2. The tire pressure monitoring system of claim 1 wherein the plurality of coils of the transmitting antenna defines an internal region, and, wherein the proximal zone ends within 60 cm of the transmitting antenna within a projection of the internal region in a transmitting direction.

3. The tire pressure monitoring system of claim 2 wherein the transmitting antenna and the cancelling antenna are configured to transmit a signal at between 30 kHz and 300 kHz.

4. The tire pressure monitoring system of claim 2 wherein the cancelling antenna surrounds the transmitting antenna.

5. The tire pressure monitoring system of claim 4 wherein the transmitting antenna comprises a circular configuration and the cancelling antenna comprises a circular configuration, and wherein the transmitting antenna and the cancelling antenna are concentric.

6. The tire pressure monitoring system of claim 5 wherein the transmitting antenna has a diameter of at least 600 mm and the cancelling antenna is radially outwardly spaced from the transmitting antenna at least 50 mm.

7. The tire pressure monitoring system of claim 5 further comprising at least one ferrite layer positioned on one side of the transmitting antenna and the cancelling antenna.

8. The tire pressure monitoring system of claim 7 further comprising at least one metal layer positioned on a side of the at least one ferrite layer opposite the transmitting antenna and the cancelling antenna so as to sandwich the at least one ferrite layer between the at least one metal layer and each of the transmitting antenna and the cancelling antenna.

9. The tire pressure monitoring system of claim 3 wherein the cancelling antenna comprises a first cancelling antenna positioned to a first side of the transmitting antenna and a second cancelling antenna positioned to a second side of the transmitting antenna.

10. The tire pressure monitoring system of claim 9 wherein the first cancelling antenna and the second cancelling antenna are substantial mirror images of each other taken about an axis bisecting the transmitting antenna.

11. The tire pressure monitoring system of claim 9 wherein the internal region of the transmitting antenna is larger than a transmitting region of either of the first cancelling antenna and the second cancelling antenna.

12. The tire pressure monitoring system of claim 9 wherein the transmitting antenna comprises one of a rectangular and square configuration having sides that are at between 100 mm and 1500 mm.

13. The tire pressure monitoring system of claim 12 wherein an internal region of at least one of the first cancelling antenna and the second cancelling antenna is less than one half the internal region of the transmitting antenna.

14. The tire pressure monitoring system of claim 13 wherein the internal region of at least one of the first cancelling antenna and the second cancelling antenna is less than one third the internal region of the transmitting antenna.

15. The tire pressure monitoring system of claim 14 wherein the first cancelling antenna and the second cancelling antenna each have an internal region with the internal region of the first cancelling antenna and the internal region of the second cancelling antenna being the same.

16. The tire pressure monitoring system of claim 9 wherein the first cancelling antenna and the second cancelling antenna are coplanar.

17. The tire pressure monitoring system of claim 16 wherein the transmitting antenna is coplanar with the first cancelling antenna and the second cancelling antenna.

18. The tire pressure monitoring system of claim 1 further comprising a receiver configured to receive a signal from a tire pressure monitor.

19. An antenna assembly comprising:
 a transmitting antenna, the transmitting antenna comprising a wire loop defined by a plurality of coils with a first terminal and a second terminal; and
 a cancelling antenna, the cancelling antenna comprising a wire loop defined by a plurality of coils with a first terminal and a second terminal;
 wherein, the arrangement of the transmitting antenna and the cancelling antenna defines a proximal zone wherein a field from the transmitting antenna is configured to be sufficient to actuate a sensor, while beyond the proximal zone, a field from the cancelling antenna cancels the field from the transmitting antenna.

20. The antenna assembly of claim 19 wherein the transmitting antenna and the cancelling antenna are configured to transmit a signal 180° out of phase.

21. The antenna assembly of claim 20 wherein the proximal zone ends within 60 cm.

22. A method of transmitting a signal to a tire pressure monitor comprising the steps of:
 providing an antenna assembly having a transmitting antenna and a cancelling antenna, wherein the antenna assembly defines a proximate zone wherein a signal of the transmitting antenna is sufficient to actuate a tire pressure monitor, and wherein outside of the proximate zone a signal from cancelling antenna and a signal from the transmitting antenna cancel each other;
 placing a tire pressure monitor within the proximate zone, while being spaced apart from the antenna assembly;
 transmitting a signal from each of the transmitting antenna and the cancelling antenna;
 actuating the tire pressure monitor.

23. The method of claim 22 further comprising the step of:
 not actuating a second tire pressure monitor that is positioned outside of the proximate zone.

24. The method of claim 22 wherein the tire pressure monitor is spaced apart from the antenna between 5 cm and 60 cm, and more preferably between 5 cm and 20 cm.

25. The method of claim 22 further comprising the step of receiving a signal from the tire pressure monitor after the step of actuating the tire pressure monitor.

* * * * *